United States Patent [19]

Aramaki

[11] Patent Number: 4,982,336

[45] Date of Patent: Jan. 1, 1991

[54] TRACER CONTROL APPARATUS

[75] Inventor: Hitoshi Aramaki, Tokyo, Japan

[73] Assignee: Fanuc, Ltd., Yamanashi, Japan

[21] Appl. No.: 368,321

[22] PCT Filed: Oct. 26, 1988

[86] PCT No.: PCT/JP88/01085

§ 371 Date: Jun. 16, 1989

§ 102(e) Date: Jun. 16, 1989

[87] PCT Pub. No.: WO89/04237

PCT Pub. Date: May 18, 1989

[30] Foreign Application Priority Data

Oct. 30, 1987 [JP] Japan .................................. 62-274801

[51] Int. Cl.⁵ ............................................. G05B 19/18
[52] U.S. Cl. ............................ 364/474.03; 364/474.35
[58] Field of Search ............ 364/474.03, 474.2, 474.37, 364/474.3, 474.35, 474.36; 318/570, 578

[56] References Cited

U.S. PATENT DOCUMENTS

| 4,296,473 | 10/1981 | Imazeki et al. | 364/520 |
| 4,433,275 | 2/1984 | Imazeki et al. | 318/578 |
| 4,646,225 | 2/1987 | Matsuura | 364/167 |
| 4,814,998 | 3/1989 | Aramaki | 364/474.03 |

Primary Examiner—Jerry Smith
Assistant Examiner—Paul Gordon
Attorney, Agent, or Firm—Staas & Halsey

[57] ABSTRACT

It is arranged for a tracer head (TC) to be rotatable in a rotational direction which adopts, as an axis of rotation, an axis parallel to an axis (e.g., the Y axis) which does not form a tracing plane. When a hollow (HL) having the vertical wall (SL) is traced, the tracer head (TC) is rotated so as not to interfer with a model (MDL), an angle of rotation ($\beta$) in the rotational direction is monitored, axial displacements ($\epsilon_x$, $\epsilon_z$) along two axes (X, Z axes) other than the axis of rotation are corrected based on the angle of rotation ($\beta$), and tracer control is performed using each of the axial displacements obtained by the correction.

4 Claims, 5 Drawing Sheets

TRACER CONTROL APPARATUS

TECHNICAL FIELD

This invention relates to a tracer control apparatus and, more particularly, to a tracer control apparatus which makes it possible to trace a model while continuously rotating a tracer head.

BACKGROUND ART

As shown in FIG. 7, tracer control usually involves detecting axial displacements $\epsilon_x$, $\epsilon_y$, $\epsilon_z$ of a stylus 1, which is in contact with a model, by means of a tracer head 2, computing a resultant displacement $\epsilon$ $$(= \sqrt{\epsilon_x^2 + \epsilon_y^2 + \epsilon_z^2})$$

obtained by combining the axial displacements by means of a mixing circuit 3, obtaining an error $\Delta\epsilon$ between the resultant displacement $\epsilon$ and a reference displacement $\epsilon_o$ by an adder circuit 4, generating a normal-direction velocity signal $V_N$ in a velocity signal generator 5 based on the characteristic $\Delta\epsilon - V_N$, and generating a tangent-direction velocity signal $V_T$ in a velocity signal generator 5 based on the characteristic $\Delta\epsilon - V_T$. Meanwhile, a tracing direction arithmetic circuit 7 generates $\cos\theta$ and $\sin\theta$ in a tracing direction $\theta$ using axial displacements $\epsilon_1$, $\epsilon_2$ lying in a tracer control plane and outputted by a changeover circuit 8, and an axial velocity signal generator 9 generates axial velocities $V_1$, $V_2$ in the tracer control plane using $V_N$, $V_t$, $\cos\theta$ and $\sin\theta$, thereby moving the stylus 1 along the model at these velocities. Tracer control is executed by subsequently repeating similar processing.

In a case where a model MDL possesses a steep incline, such as a hollow HL having vertical walls, as shown in FIG. 8, the foregoing tracer control method is such that when the stylus 1 is moved along a vertical wall portion SL, a corner portion 2a of the tracer head 2 is obstructed by the model MDL and tracing cannot be performed.

Accordingly, an object of the invention is to provide a tracer control apparatus which enables a tracer head to trace a model without impedement even if the model profile has projections and cavities of a kind that obstruct the tracer head.

Another object of the invention is to provide a tracer control apparatus which enables a model to be traced while the tracer head is continuously rotated and arranged so as not to be obstructed by the model.

DISCLOSURE OF THE INVENTION

In accordance with the tracer control apparatus of the present invention, it is arranged for a tracer head to be rotatable in a direction which adopts, as an axis of rotation, an axis parallel to an axis which does not form a tracing plane, and an angle of rotation in this rotational direction is monitored. Axial displacements along two axes forming the tracing plane are corrected based on the angle of rotation, and tracer control is performed using each of the axial displacements obtained by the correction.

BEST MODE FOR CARRYING OUT THE INVENTION

Figure 1A:
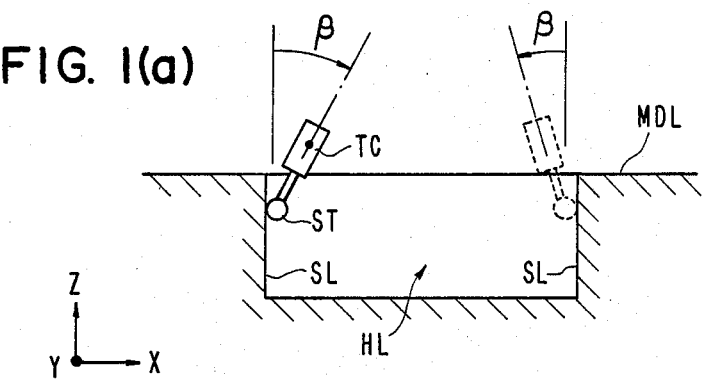
FIGS. 1(a)+(b) are views for describing the general features of the present invention, in which (a) is an XZ sectional view and (b) a YZ sectional view.
Figure 1B:
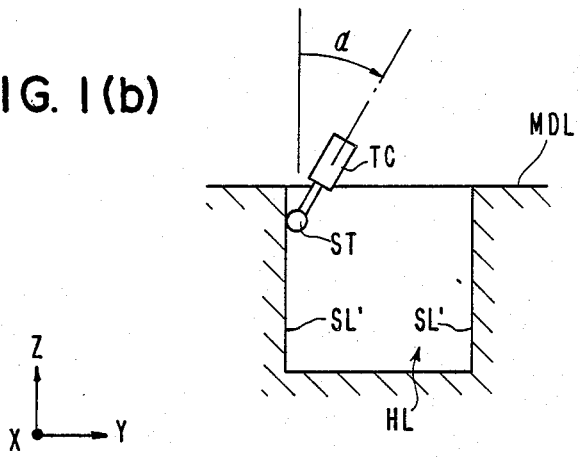

FIG. 1 is a view for describing the general features of the present invention, in which (a) is an XZ sectional view and (b) a YZ sectional view.

ST represents a stylus, TC a tracer head, MDL a model, HL a hollow in the model, and SL, SL' vertical walls.

It is arranged for the tracer head TC to be rotatable in a rotational direction which adopts, as an axis of rotation, an axis parallel to an axis [e.g., the Y axis in FIG. 1(a)] which does not form a tracing plane. When the hollow HL having the vertical wall SL is traced, the tracer head TC is rotated so as not to interfere with the model MDL, an angle of rotation $\beta$ in the rotational direction is monitored, axial displacements $\epsilon_x$, $\epsilon_z$ along two axes (X, Z axes) other than the axis of rotation are corrected based on the angle of rotation $\beta$, and tracer control is performed using each of the axial displacements obtained by the correction.

Figure 2:
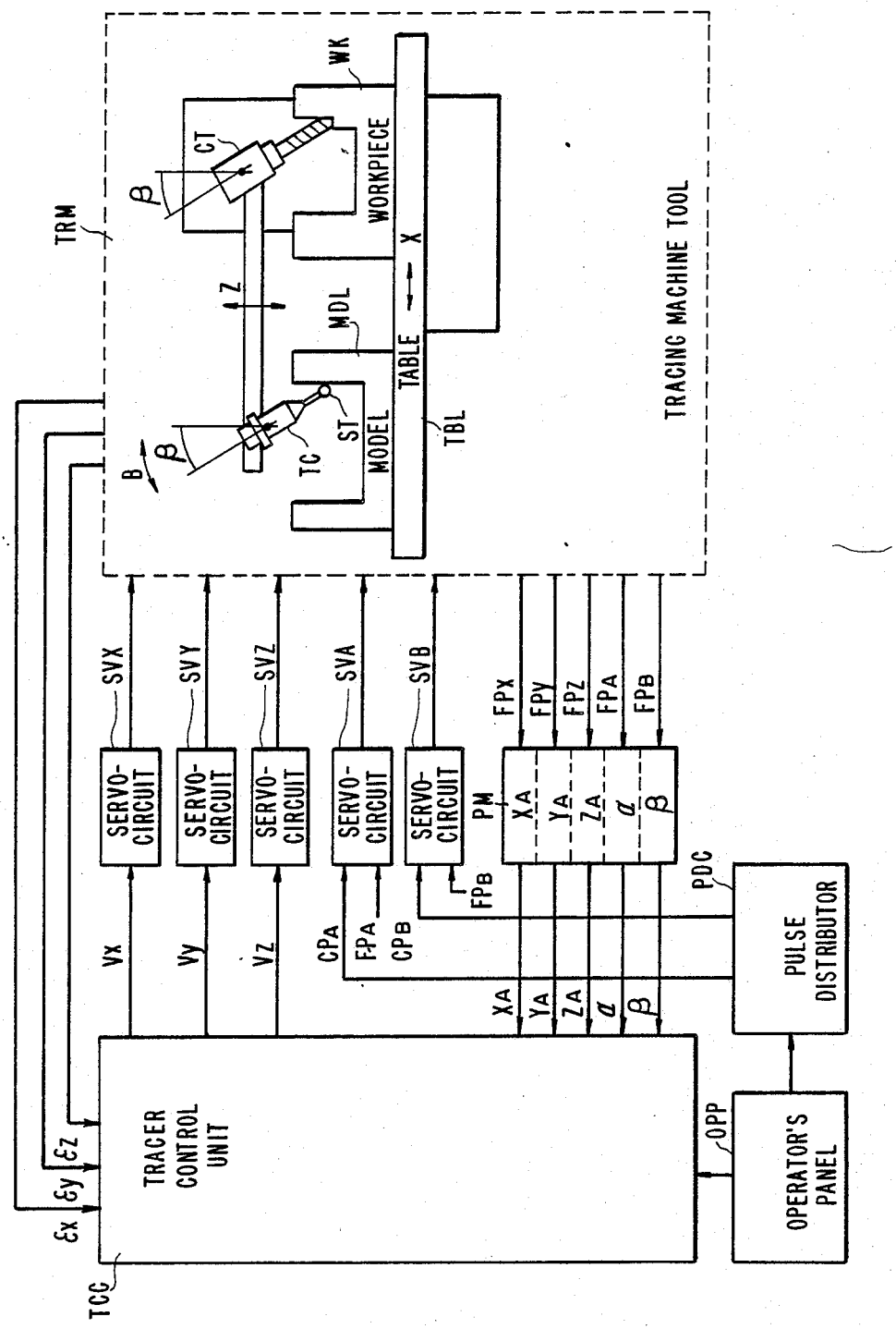
FIG. 2; is a block diagram of a tracer control system according to the invention.
Figure 3:
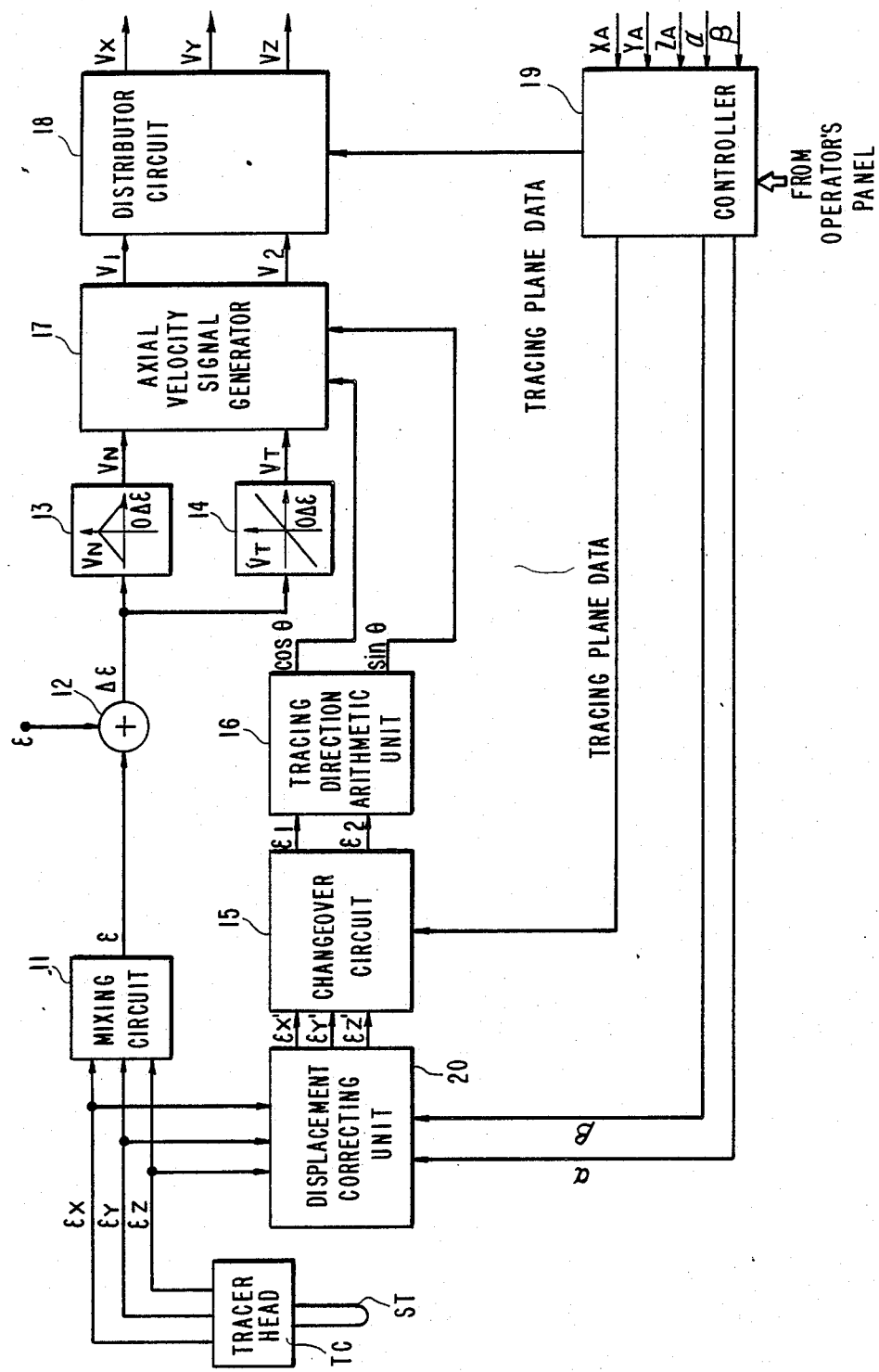
FIG. 3 is a block diagram of a tracer control unit.

FIG. 2 is a block diagram of a tracer control system according to the invention, and FIG. 3 is a block diagram of a tracer control unit.

In FIG. 2, TRM represents a tracing machine tool, TCC a tracer control unit for executing tracer control, OPP an operator's panel for setting various data necessary for tracing, and for rotating the tracer head in an A-axis direction and a B-axis direction, PDC a pulse distributor, and SVX, SVY, SVZ, SVZ, SVB servo-circuits for the respective axes.

The servo-circuits SVX−SVZ apply a DA conversion to digitally provided velocity commands $V_X - V_Z$ from the tracer control unit TCC, and control the velocity of the servomotors (not shown) of respective axes. Meanwhile, the servo-circuits SVA, SVB generate velocity commands along the A and B axes upon receiving, as inputs, command pulses $CP_A$, $CP_B$ generated by the pulse distributor PDC and detection pulses $FP_A$, $FP_B$ generated each time the respective A- and B-axis motors (not show) rotate through a predetermined angle.

PM denotes a position memory which monitors present position along each axis by up/down counting, in dependence upon the direction of rotation, detection pulses $FP_X - FP_B$ generated each time the motors of the respective axes rotate a predetermined amount.

The tracing machine tool TRM is provided with the following, not shown:

(i) X- and Y-axis motors for driving a table TBL along the X- and Y-axis directions, respectively;

(ii) a Z-axis motor for driving the tracer head TC and a cutter head CT in unison along the Z-axis;

(iii) an A-axis motor for rotating the tracer head and cutter head in a direction (referred to as the A-axis direction) adopting an axis parallel to the X axis as the axis of rotation; and (iv) a B-axis motor for rotating the tracer head and cutter head in a direction (referred to as the B-axis direction) adopting an axis parallel to the Y axis as the axis of rotation, and pulse generators each for generating one of the detection pulses $FP_X$, $FP_Y$, $FP_Z$, $FP_A$, $FP_B$ whenever the respective axial motor rotates a predetermined amount. It is permissible to adopt an arrangement in which the table TBL is rotated instead of rotating the tracer head and cutter head in the A-axis direction, with the tracer head and cutter head being rotated only in the B-axis direction.

The model MDL and workpiece WK are secured to the table TBL, and the prescribed tracing is performed by bringing the stylus ST, which is attached to the tracer head TC, into abutting contact with the surface of the model. The cutter head CT subjects the workpiece WK to machining conforming to the shape of the model. As is well known, the tracer head TC is arranged to detect deviations $\epsilon_x$, $\epsilon_y$, $\epsilon_z$ in the surface of the model MDL along the respective X, Y, Z axes.

In the profile control unit of FIG. 3, ST represents the stylus, TC the tracer head, 11 a mixing circuit, 12 an adder circuit, 13, 14 velocity signal generators for generating the normal-direction velocity signal $V_N$ and the tangent-direction velocity signal $V_T$, respectively, 15 a changeover unit for outputting, as $\epsilon_1$, $\epsilon_2$, displacements forming the tracing control plane, 16 a tracing direction arithmetic unit, 17 an axial velocity signal generator for generating velocity signals $V_1$, $V_2$ in axial directions forming the tracing control plane, 18 a pulse distributor circuit for distributing the velocity signals $V_1$, $V_2$ to the servo-circuits of the respective axes as velocity commands along the axes forming the tracing plane, 19 a controller for performing overall tracer control using the data necessary for tracer control, which have been set by the operator's panel OPP (see FIG. 2) and the present positions XA -$\beta$ along the respective axes, and 20 a displacement correcting unit for correcting the axial displacements $\epsilon_x$, $\epsilon_y$, $\epsilon_z$ based on the rotational angles $\alpha$, $\beta$ in the A-axis and B-axis directions.

Figure 4:
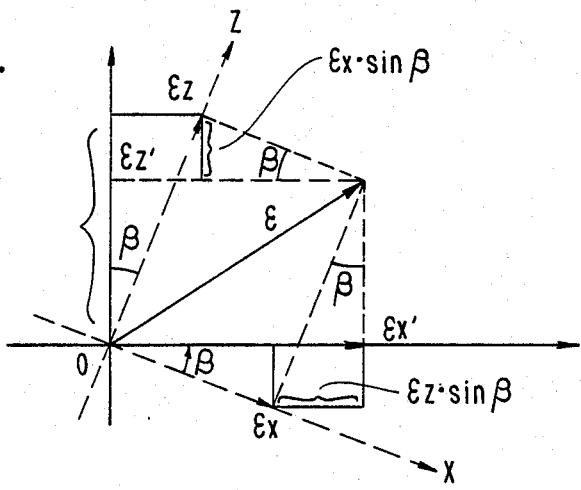
FIG. 4 is a view for describing displacement correction computations based on B-axis rotation.

FIG. 4 is a view for describing displacement correction computations in the displacement correcting unit 20. For example, if the tracer head TC is rotated by $\beta$ in the B-axis direction (a direction in which rotation is performed with the Y axis as the central axis of rotation) in order to avoid interference with the model when surface tracing is performed in the XZ tracing plane (see the solid dashed lines in FIG. 4), this is equivalent, in relative terms, to rotating the XZ tracing plane by $\beta$ while holding the tracer head fixed. From FIG. 4, the axial displacements $\epsilon_x'$, $\epsilon_z'$ following rotation are as indicated by the following equations, using the axial displacements $\epsilon_x$, $\epsilon_z$ prior to rotation and the rotational angle $\beta$:

$$\epsilon_x' = \epsilon_z \sin\beta + \epsilon_x \cos\beta \quad (1)$$

$$\epsilon_z' = \epsilon_z \cos\beta - \epsilon_x \sin\beta \quad (2)$$

Similarly, if the tracer head TC is rotated by in the A-axis direction (a direction in which rotation is performed with the X axis as the central axis of rotation) when surface tracing is performed in the YZ tracing plane, the axial displacements $\epsilon_y'$, $\epsilon_z'$ are as indicated by the following equations, using the displacements $\epsilon_y$, $\epsilon_z$ prior to rotation and the rotational angle $\alpha$:

$$\epsilon_y' = \epsilon_z \sin\alpha + \epsilon_y \cos\alpha \quad (3)$$

$$\epsilon_z' = \epsilon_z \cos\alpha - \sin\alpha \quad (4)$$

It should be noted that in a case where rotation is performed by $\alpha$, $\beta$ simultaneously along the A and B axes, $\epsilon_y'$, $\epsilon_z'$ are obtained from Eqs. (3), (4), with $\epsilon_z'$ obtained by the computations of Eqs. (1), (2) serving as $\epsilon_z$ afresh. Accordingly, the displacement correcting unit 20 corrects the axial displacements to $\epsilon_x'$, $\epsilon_y'$, $\epsilon_z'$ by performing the computations of Eqs. (1)–(4) using the variable displacements $\epsilon_x$, $E_y$, $\epsilon_z$ and the rotational angles $\alpha$, $\beta$ in the A- and B-axis directions.

The overall operation of the invention will now be described in accordance with FIGS. 1 through 3.

By way of example, if surface tracing is performed in the XZ tracing plane, the tracer head TC is rotated in the B-axis direction, so as not to interfere with the model MDL, when the hollow HL having the vertical wall SL [see FIG. 1(a)] is traced. More specifically, rotation conforming to a predetermined rotational angle is commanded by operating B-axis manual feed means (a manual handle or jog button) provided on the operator's panel OPP (FIG. 2). An arrangement can be adopted in which the rotational angle is preset to a fixed value.

In response, the pulse distributor circuit PDC generates commanded pulses $CP_B$, the number whereof corresponds to the commanded rotational angle, having a frequency conforming to the preset velocity. As a result, the servo-circuit SVB performs well-known velocity control to rotate the B-axis motor, thereby rotating the tracer head TC and cutter head CT in unison in the B-axis direction.

When the detection pulse $FP_B$ is generated by rotation of the B-axis motor, the present position $\beta$ along the B axis in position memory PM is updated in real-time. Since XZ surface tracing is performed in parallel with the foregoing B-axis rotation control, the present positions XA, ZA along the X and Z axes are also updated.

The controller 19 (FIG. 3) of the tracer control unit TCC reads the present positions along the respective axes, performs tracer control in accordance with the predetermined tracing cycle sequence, and applies the present positions $\alpha$, $\beta$ along the A and B axes to the displacement correcting unit 20 at predetermined time intervals.

The displacement correcting unit 20 performs the computations of Eqs. (1)–(4) whenever $\alpha$ and $\beta$ are applied thereto, thereby generating the corrected axial displacements $\epsilon_x'$, $\epsilon_y'$, $\epsilon_z'$ conforming to the rotational angles, in the A-and B-axis directions, of the tracer head. The changeover circuit 15 outputs the corrected displacements conforming to the tracing plane, and the tracing direction arithmetic unit 16 computes and outputs $\cos\theta$, $\sin\theta$ of the directions of displacement using the corrected displacements that have entered. The axial velocity signal generator 17 generates the axial velocities $V_1$, $V_2$ in the tracing control plane using the normal- and tangent-direction velocities $V_N$, $V_T$ and the displacement directions $\cos\theta$, $\sin\theta$, and the distributor circuit 18 distributes the velocities $V_1$, $V_2$ along the axes forming the tracing plane, thereby moving the stylus 1 along the model. Processing similar to the foregoing is repeated to execute tracer control.

As will be evident from FIG. 4, the resultant displacement $\epsilon$ is the same whether using the displacement before correction or the displacement after displacement. Therefore, in FIG. 3, the resultant displacement $\epsilon$ is computed using the displacements $\epsilon_x$, $\epsilon_y$, $\epsilon_z$ before correction.

Figure 5:
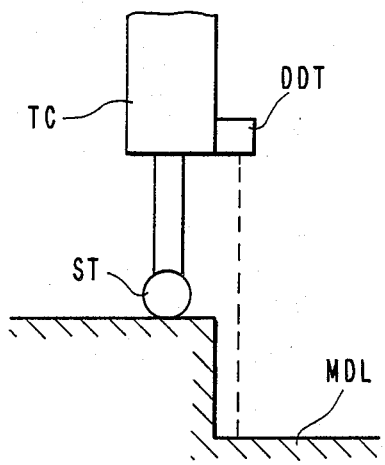
FIG. 5 is a view for describing a detection principle for detecting inclination of a model surface.

In the foregoing, the angles of rotation are commanded manually from the operator's panel. However, as shown in FIG. 5, an arrangement can be adopted in which a distance detector DDT is provided for optically detecting a distance L from the tracer head TC to the model MDL. When a fluctuation in the distance exceeds a set value, this is construed as indicating an inclination and predetermined rotational angles $\alpha_o$, $\beta_o$ are commanded.

Figure 6:
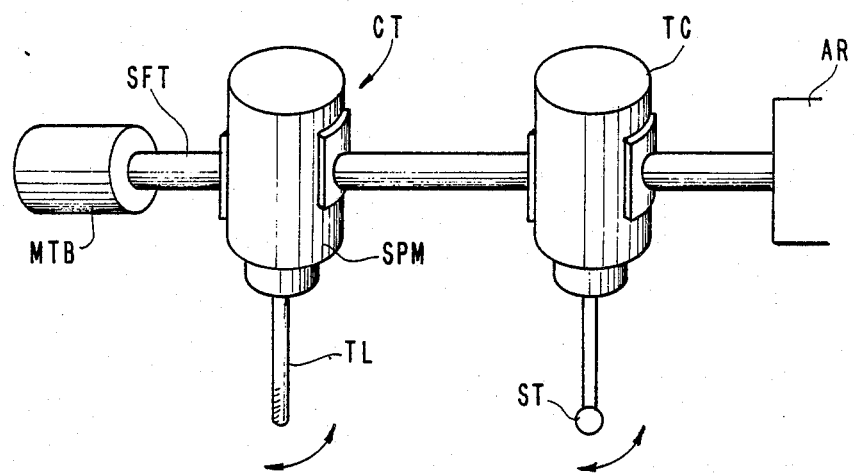
FIG. 6 is a view for describing a tracer head rotating mechanism.
Figure 7:
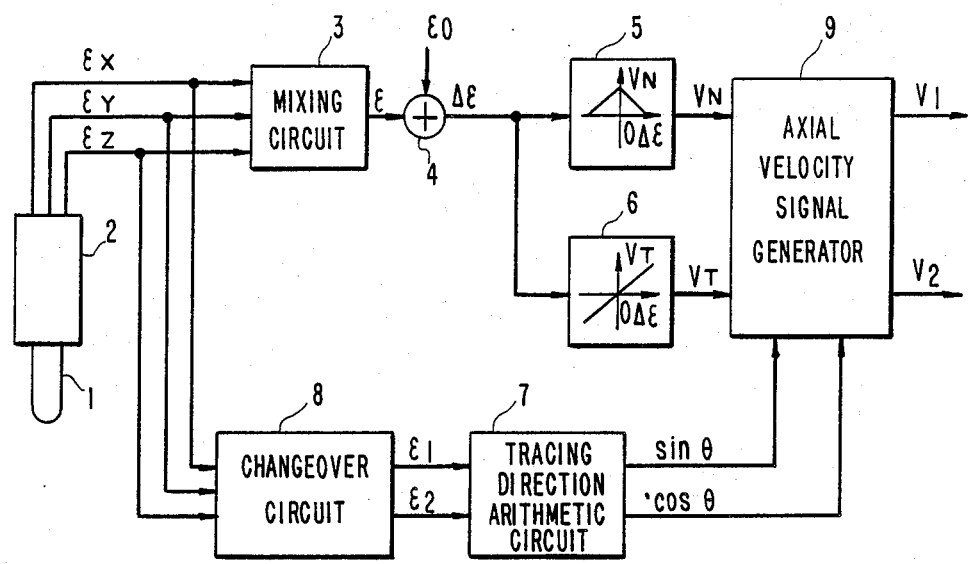
FIGS. 7 and 8 are views for describing a problem encountered in the prior art.
Figure 8:
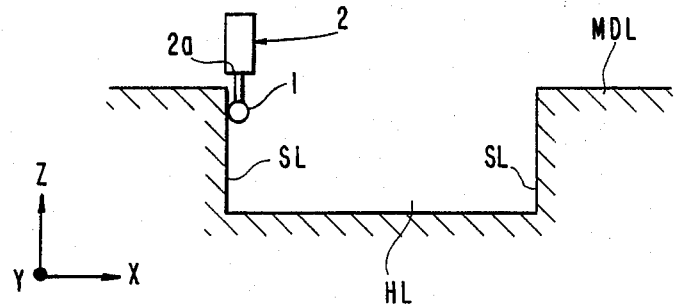

Further, though the invention is described above for a case where rotation is performed in the two directions A and B, it can be arranged so that rotation is effected solely in the B-axis direction, by way of example. In this case, as shown in FIG. 6, the arrangement would be such that a shaft SFT of a B-axis motor MTB is rotatably supported by a bearing AR, the tracer head TC and a spindle motor SPM of the cutter head CT are fixed to the shaft, and the tracer head and cutter head are rotated in unison in the direction of the arrows by rotating the B-axis motor MTB.

Thus, in accordance with the present invention, it is arranged for a tracer head to be rotatable in a rotating direction which adopts, as an axis of rotation, an axis parallel to an axis which does not form a tracer control plane, and an angle of rotation in this rotational direction is monitored. Axial displacements along two axes forming the tracing plane are corrected based on the angle of rotation, and tracer control is performed using each of the axial displacements obtained by the correction. As a result, tracing can be performed without the tracer head interfering with the model even if the model has sharply inclined projections or cavities.

I claim:
1. A tracer control apparatus for tracing a model surface by computing feed rate components along respective axes in a tracer control plane based on a difference between a reference displacement and a resultant displacement, which is the result of combining axial displacements from a tracer head, and a tracing direction, characterized by comprising:
    rotating means for rotating the tracer head in a direction which adopts, as an axis of rotation, an axis parallel to an axis which does not form said tracer control plane;
    means for monitoring an angle of rotation in said rotational direction;
    means for correcting, based on said angle of rotation, axial displacements along two axes forming the tracer control plane; and
    means for performing tracer control using each of the axial displacements obtained by the correction.

2. A tracer control apparatus according to claim 1, characterized in that said displacement correcting means computes corrected displacements $\epsilon_x'$, $\epsilon_z'$ along respective axes in accordance with the following equations:

$$\epsilon_x' = \epsilon_z \sin\beta + \epsilon_x \cos\beta$$

$$\epsilon_z' = \epsilon_z \cos\beta - \epsilon_x \sin\beta$$

where $\beta$ represents said angle of rotation, two axes forming the tracer control plane are X and Z axes, and $\epsilon_x$, $\epsilon_z$ represent displacements along the X and Z axes.

3. A tracer control apparatus according to claim 2, characterized by having an operator's panel for commanding rotation of the tracer head.

4. A tracer control apparatus according to claim 2, characterized by having inclination detecting means for commanding rotation of the tracer head upon detecting that a change in a distance to the model surface has exceeded a set value.

* * * * *